United States Patent
Palatov et al.

(10) Patent No.: US 11,874,099 B2
(45) Date of Patent: Jan. 16, 2024

(54) ELECTRONIC DISTANCE MEASUREMENT EQUIPMENT

(71) Applicant: SECOND BRIDGE INC., Beverly Hills, CA (US)

(72) Inventors: Dennis Palatov, Portland, OR (US); Marc Ganouna, Beverly Hills, CA (US)

(73) Assignee: SECOND BRIDGE INC., Beverly Hills, CA (US)

( * ) Notice: Subject to any disclaimer, the term of this patent is extended or adjusted under 35 U.S.C. 154(b) by 805 days.

(21) Appl. No.: 16/966,852

(22) PCT Filed: Jan. 30, 2019

(86) PCT No.: PCT/IB2019/050750
§ 371 (c)(1),
(2) Date: Jul. 31, 2020

(87) PCT Pub. No.: WO2019/155325
PCT Pub. Date: Aug. 15, 2019

(65) Prior Publication Data
US 2021/0041223 A1 Feb. 11, 2021

Related U.S. Application Data

(60) Provisional application No. 62/627,303, filed on Feb. 7, 2018.

(30) Foreign Application Priority Data

Mar. 14, 2018 (FR) ...................................... 18 70284

(51) Int. Cl.
*G01B 11/00* (2006.01)
*H04W 4/024* (2018.01)
*G01S 17/06* (2006.01)

(52) U.S. Cl.
CPC ............ *G01B 11/007* (2013.01); *G01S 17/06* (2013.01); *H04W 4/024* (2018.02)

(58) Field of Classification Search
None
See application file for complete search history.

(56) References Cited

U.S. PATENT DOCUMENTS

2008/0265799 A1 10/2008 Sibert
2014/0023363 A1 1/2014 Apte et al.
(Continued)

FOREIGN PATENT DOCUMENTS

JP 2009 253494 A 10/2009
JP 2013 167559 A 8/2013
(Continued)

*Primary Examiner* — Frantz Bataille
(74) *Attorney, Agent, or Firm* — H&I PARTNERS; C. Andrew Im; Jean-Christophe Hamann

(57) ABSTRACT

An assembly is provided combining a low power light source, a distance measuring radio, an electrical storage and an adapter compatible with an existing socket for a light unit. The unique configuration of the assembly enables deployment of distance measuring radios in buildings, vehicles and outdoor venues without the need to install dedicated infrastructure such as electrical grid connections. A method is further disclosed of automatically determining the location of a newly installed assembly by first learning the locations of already installed neighboring assemblies, measuring the distances to such known assemblies, and using the measured distances to determine the location of the newly installed assembly.

8 Claims, 1 Drawing Sheet

(56) References Cited

U.S. PATENT DOCUMENTS

2017/0041070 A1* 2/2017 Ryan .................... H04W 4/025
2018/0054706 A1   2/2018 Kastee et al.
2018/0231668 A1* 8/2018 Xia ......................... G01S 5/14

FOREIGN PATENT DOCUMENTS

WO    2008/029326 A2    3/2008
WO    2010/063001 A1    6/2010

* cited by examiner

ELECTRONIC DISTANCE MEASUREMENT EQUIPMENT

RELATED APPLICATIONS

This application is a § 371 application of PCT/IB2019/050750 filed Jan. 30, 2019, which claims priority from French Patent Application No. 18 70284 filed Mar. 14, 2018 and which claims benefit of U.S. Provisional Application No. 62/627,303 filed Feb. 7, 2018, each of which is incorporated herein by reference in its entirety.

FIELD OF THE INVENTION

The present invention relates to an electronic distance measurement equipment and the installation thereof.

BACKGROUND OF THE INVENTION

With the advent of low-cost With the advent of low-cost, low power radio distance measurement technologies such as UWB (Ultra Wide Band), RFID (Radio Frequency Identification) and others, there has been growing demand for deploying geolocation systems to keep track of people and assets. The technology works by measuring distances between a movable node, commonly referred to as tag, and a plurality of stationary nodes who's positions are known, commonly referred to as anchors. Once a set of distances to multiple anchors is measured, geometric calculations are performed to determine the location of the moving tag. A number of such systems are known, for example those using the DW1000 integrated circuit from Decawave.

Even though the state of UWB and other technologies allows the construction of inexpensive radio distance measurement equipment, its limited range requires the installation of multiple fixed-location anchors in a given geographic location in order to provide adequate tag movement tracking. Typical achievable measurement distances range from as much as 200 meters to only 10 meters or less.

The current state of the art in radio technology allows low power operation, so an anchor can operate for an extended period of time from a battery. However since manual replacement or recharging of hundreds or thousands of stationary Anchor nodes is not practical, at least an intermittent source of electrical power is needed. Solar cells are an option in some cases but they are expensive and create additional requirements and restrictions on Anchor location and installation.

Adding a wired connection to the local electrical grid, either directly or by means of converters and adapters, is the most practical way of providing power to anchors. Unfortunately this creates a very substantial installation cost in terms of labor, facility downtime and maintenance, creating obstacles to wide deployment.

A similar challenge exists for mounting anchor nodes in vehicles—physical wiring must be routed to connect to the vehicle electrical system, often involving removal and/or modification of interior panels.

Further, to be effective the distance measuring radios have to be placed in locations that both provide reasonable protection from the elements and an unobstructed path for the propagation of radio signals.

Once installed, the exact location of the anchor node has to be programmed into the node in order for it to serve as a useful location reference for moving tags. If the location is predetermined, it may be programmed prior to installation but this creates significant logistics burden and introduces potential for errors. If a technician is required to program the location of an anchor on installation, this raises the installation labor cost and introduces the need for specialized equipment.

What is needed is a way of rapidly installing a distance measuring radio anchors in ubiquitously existing locations that provide at least intermittent existing electrical power, protection from the elements, and clear path for propagating radio signals. A method is also desired for automatically determining the location of a newly installed anchor without the need for manual or prior configuration. The present invention teaches an assembly and a method as a means of meeting this need.

SUMMARY OF THE INVENTION

The terms "invention", "the invention", "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

A primary objective of the present invention is to provide a means of deploying anchors in buildings, vehicles and outdoor venues without the need to install dedicated infrastructure such as electrical grid connections. A secondary objective is to provide a method of automatically determining anchor location and configuring anchors upon installation.

To meet the primary objective, according to the present invention, an assembly is disclosed comprising an anchor radio, an electrical energy storage means, an LED light source, and a means of installing the assembly into an existing conventional light source socket.

Conventional light sources such as light bulbs are ubiquitous and are commonly found in buildings, vehicles and outdoor venues and are usually placed at regular intervals within a few meters or tens of meters of each other. Standardized light source receptacle sockets are well known. Each existing light source location already has at least an intermittent source of electrical power installed. Therefore these locations provide ideal placement for anchors.

On a vehicle, light sources such as turn signals, marker and indicator lights are located at the outside corners of the vehicle, behind transparent or semi-transparent covers that provide protection from the elements while allowing unobstructed propagation of radio signals.

In a building, light sources are placed at regular intervals and have protective covers. Similar is true for many outdoor venues.

However, it is not practical to simply remove light sources and replace them with anchors since their primary purpose is still to provide light. A large number of currently installed light sources still use incandescent technology which generates significant heat that would adversely affect the service life of an anchor were it to be placed in close proximity. LED technology has made great advances in recent years and many of older light sources are now being replaced with LED equivalents. LED light sources with adapters to install them in existing standard light source sockets are well known.

A LED light source is practical to co-locate with an anchor radio because it generates very little heat, is compact, and consumes relatively little energy. Combined with the compact size of existing distance measurement radios, this makes it practical to create the assembly of the present invention. Other type of low power light source could be used.

To achieve its primary objective, the assembly of the present invention comprises a distance measuring Anchor radio, an LED light source, a means of storing electrical energy, and an adapter to facilitate installation of the assembly into a standard light source socket. Electrical energy is stored whenever electrical power is supplied to the light source socket, and is used for operation of the anchor radio when socket power is not available.

To achieve the secondary objective, the present invention discloses a method of automatically determining the location of a newly installed assembly by first configuring it as a tag, learning the locations of already installed neighboring anchors, as well as tags with known locations, measuring the distances to such known anchors and tags, and using the distances to determine the location of the newly installed anchor. Once the location has been determined, the assembly is reconfigured as an anchor.

More specifically, the invention relates to an assembly comprising:
  a low power light source,
  a distance measuring radio,
  an electrical energy storage means; and
  an adapter compatible with a standard light source socket.

According to a particular embodiment, the low power light source is a LED light source.

According to a particular embodiment, said assembly being of a shape and size compatible with a standard light source.

According to a particular embodiment, said standard light source is a light unit for a vehicle.

According to a particular embodiment, said assembly being configured so that electrical energy is received from the socket during the times when light source is illuminated and is stored in the electrical energy storage means, the stored energy being used to power the distance measuring radio during periods when no electrical power is provided to the socket.

According to a particular embodiment, electrical energy storage means (200) may be a battery, a capacitor or similar means.

The invention is also directed to a method of configuring an assembly as previously defined comprising the steps of:
  a) checking whether location of the assembly has already been determined,
  b) if yes, proceeding to step g),
  c) if no, configuring assembly as a tag and scanning for neighbors with known locations,
  d) when at least 3 neighbors with known locations are detected, proceeding to e) otherwise proceeding to step c),
  e) measuring distances to at least 3 neighbors with known locations,
  f) calculating assembly location, and
  g) configuring assembly as an anchor.

The invention is also directed to a method of providing a visual indication from an assembly as previously defined, said method consisting of alternatively illuminating and dimming said light source in a timed pattern, said pattern being responsive to a status of said distance measuring radio, wherein electrical power for said illuminating of light source is at least partially supplied from said electrical power storage means, and wherein said electrical power storage means is at least periodically recharged by means of electrical power supplied via said adapter.

BRIEF DESCRIPTION OF THE DRAWINGS

The present invention is described herein with reference to the following drawings.

DETAILED DESCRIPTION OF AN EMBODIMENT OF THE INVENTION

Figure 1:
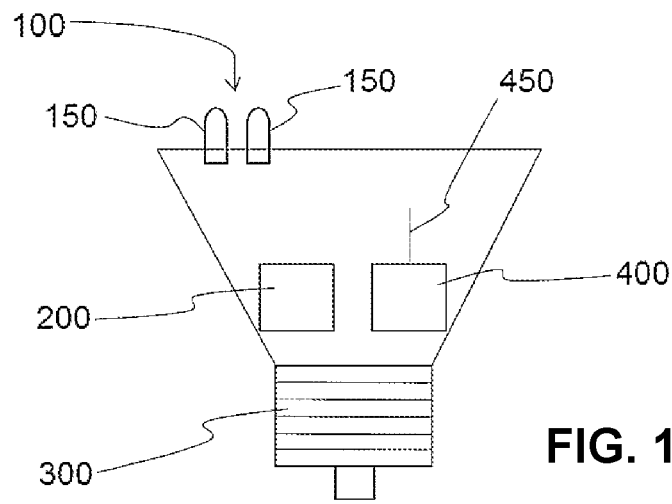
FIG. 1 is a diagram side view of the assembly of the present invention.

A representative embodiment of the present invention is illustrated schematically in FIG. 1. The assembly of the present invention comprises low power light source 100. Preferably, this low power light source 100 is a LED light source further comprising individual LED elements 150. The assembly further comprises an electrical energy storage means 200, an adapter 300 to facilitate installation of the assembly into a pre-existing standard light source socket, and a distance measuring radio 400, further comprising an antenna 450.

The assembly of the present invention is configured to be compatible in overall size and shape with standard light sources, and to be compatible with standard light source sockets by means of adapter 300. The assembly is installed by removing an existing light source from its socket and installing the compatible assembly in said socket.

The resultant installation continues to provide light source function by means of the LED light source 100 integrated in the assembly, and further provides anchor functionality by means of the distance measuring radio 400. Electrical energy is received from the socket during the times when light source is illuminated and is stored in electrical energy storage means 200, which may be a battery, a capacitor or similar means. The stored energy is used to power the distance measuring radio 400 during periods when no electrical power is provided to the socket.

In addition to providing light source and distance measuring radio function, an assembly of the present invention is able to provide a visual indication by illuminating the light source 100 using energy stored in energy storage means 200, at times when no electrical energy is supplied to the socket. At times when energy is supplied to the socket, an indication may be provided by turning off or dimming the light source 100. In either circumstance, a typical indication would consist of a timed pattern of illuminating and dimming the light source 100. Such pattern would be responsive to a particular status of the distance measuring radio 400.

Another illustrative embodiment of the present invention is a complete light unit assembly for a vehicle, including the lens and its mounting means, such as a turn signal assembly, brake light assembly, daytime running light assembly and the like. In this embodiment, the adapter 300 is the means of installing said light unit in or on the vehicle bodywork, and the compatible socket is the receiving means for such a unit on the vehicle.

The unique and innovative configuration of the assembly combining a LED light source 100, a distance measuring radio 400, an electrical storage means 200 and an adapter 300 compatible with an existing socket for a light unit, allows the present invention to achieve its primary objective to provide a means of deploying anchors in buildings, vehicles and outdoor venues without the need to install dedicated infrastructure such as electrical grid connections.

Figure 2:
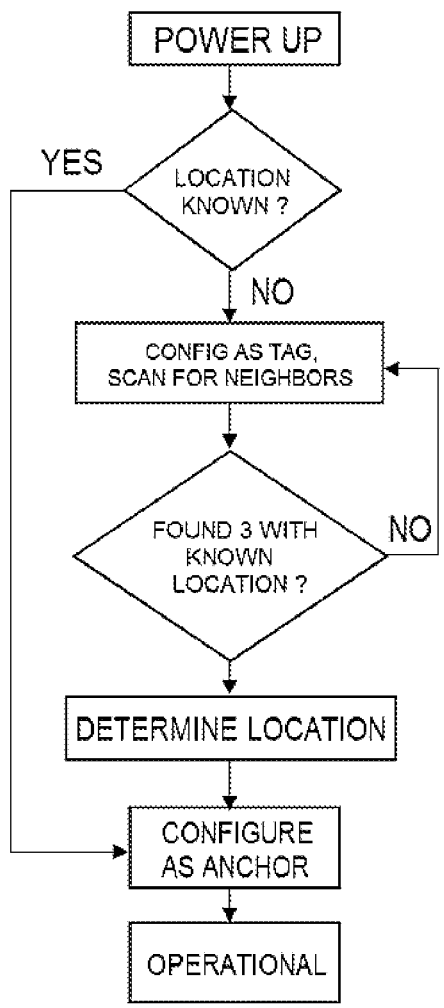
FIG. 2 is a diagrammatic representation of the method of the present invention.

An embodiment of the method of the present invention is illustrated diagrammatically in FIG. 2. Upon initial power-up, the distance measuring radio 400 checks to see if its location has already been determined. If yes, the assembly is configured as an anchor in operating mode and begins regular operation consisting in measuring distances to moving tags.

If the location has not yet been determined, the assembly enters in a configuring mode as a tag and begins to scan for neighboring anchors and tags whose position has already been determined. The distance measuring radio 400 is then configured to measure distance between the assembly and neighbors with known locations. The scan is continued until at least 3 such neighbors are detected. Once at least 3 neighbors with determined positions are identified, distances to those neighbors are measured by means of the distance measuring radio 400, and a location of the assembly is geometrically computed by trilateration.

Once location is determined, the distance measuring radio 400 is configured as an anchor and begins regular operation in a normal operating mode.

In other words, upon first installation of an assembly of the present invention, its position is initially unknown. The assembly enters configuration mode and acts as a tag, attempting to measure distances to a plurality of anchors with known positions. Once sufficient number of distances to known position is obtained, the position of the newly configured anchor device (the present assembly) is computed and becomes known.

Since the assembly will remain stationary, its known position can now be used in operating mode to measure distances to moving tags. Moving tags can therefore use the known position and distance to the newly configured anchor (the present assembly), along with like information from other configured anchors, to determine the position of the moving tags.

The embodiments disclosed herein are illustrative and not limiting; other embodiments shall be readily apparent to those skilled in the art based upon the disclosures made herein, without departing from the scope of the present invention.

The invention claimed is:

1. An assembly comprising:
   a light source;
   an electrical energy storage;
   an adapter compatible with a standard light source socket;
   a distance measuring radio configured to scan, in a configuring mode as a tag, for neighboring anchors and tags whose position has already been determined and then configured to measure distance between the assembly and neighbors with known positions and once at least three neighbors with known positions are identified, distances to said at least three neighbors being measured by the distance measuring radio, such that a location of the assembly is geometrically computed by trilateration, the assembly being configured as an anchor; and
   wherein the distance measuring radio in a normal operating mode, since the assembly will remain stationary, a known position of the assembly is used to measure distances to moving tags, moving tags being able to use the known position and distance to a newly configured anchor consisting of the assembly, along with information from other configured anchors, to determine positions of the moving tags.

2. The assembly of claim 1, wherein the light source is a LED light source.

3. The assembly of claim 1, said assembly being of a shape and size compatible with a standard light source.

4. The assembly of claim 3 wherein said standard light source is a light unit for a vehicle.

5. The assembly of claim 1, wherein said assembly being configured so that electrical energy is received from the standard light source socket when the light source is illuminated and is stored in the electrical energy storage, the stored energy being used to power the distance measuring radio during periods when no electrical power is provided to the standard light source socket.

6. The assembly of claim 1, wherein the electrical energy storage is a battery or a capacitor.

7. A method of configuring an assembly comprising
   a light source;
   a distance measuring radio;
   an electrical energy storage; and
   an adapter compatible with a standard light source socket and using the assembly to determine locations of moving tags, said method comprising successive steps of:
   a) checking whether a location of the assembly has already been determined,
   b) proceeding to step g) when the location of the assembly has been determined,
   c) configuring assembly as a tag and scanning for neighbors with known locations when the location of the assembly has not been determined,
   d) proceeding to step e) when at least 3 neighbors with known locations are detected, otherwise returning step c),
   e) measuring distances to said at least 3 neighbors with the known locations,
   f) calculating the location of the assembly by trilateration,
   g) configuring the assembly as an anchor, and
   wherein in a normal operating mode, since the assembly will remain stationary, a known location of the assembly is used to measure distances to the moving tags, the moving tags being able to use the known location and distance to a newly configured anchor consisting of the assembly, along with information from other configured anchors, to determine the locations of the moving tags.

8. A method of providing a visual indication from an assembly of claim 1, comprising alternatively illuminating and dimming said light source in a timed pattern, said timed pattern being responsive to a status of said distance measuring radio, wherein an electrical power to illuminate said light source is at least partially supplied from said electrical power storage, and wherein said electrical power storage is at least periodically recharged by an electrical power supplied via said adapter.

* * * * *